March 2, 1954
D. RUBENSTEIN
2,671,158
ELECTRICALLY HEATED BUILDING STRUCTURE
Filed Dec. 17, 1951
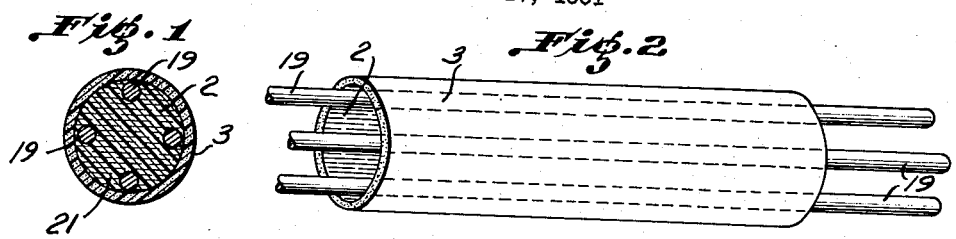
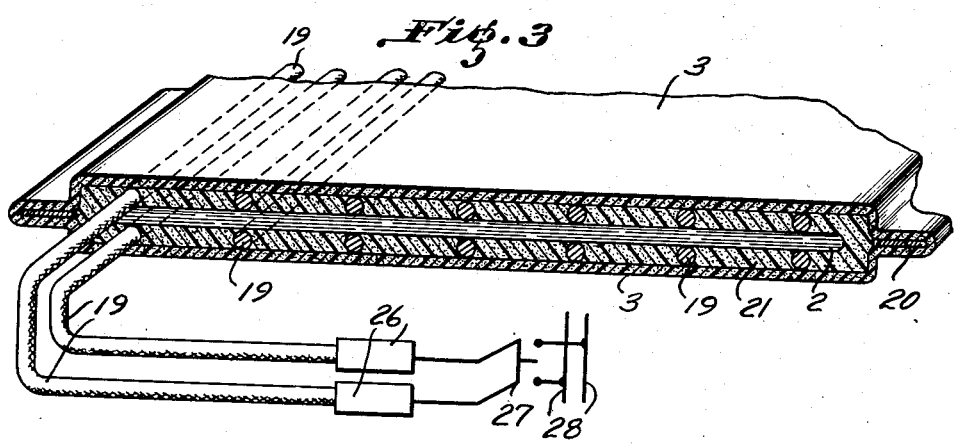
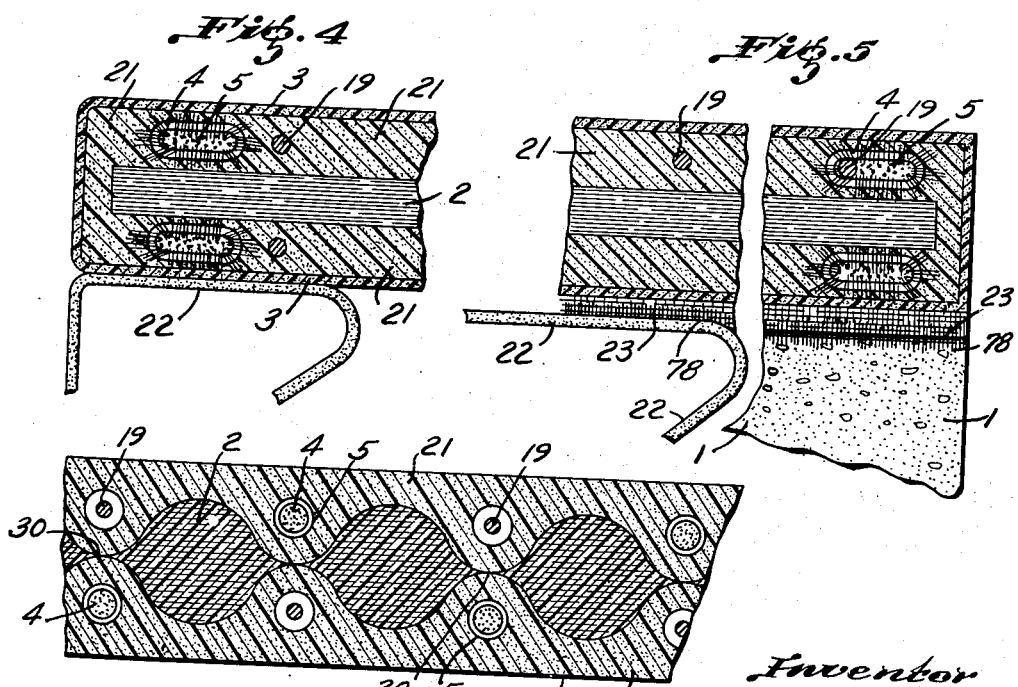
Inventor
David Rubenstein Patented Mar. 2, 1954

2,671,158

UNITED STATES PATENT OFFICE 2,671,158

ELECTRICALLY HEATED BUILDING STRUCTURE

David Rubenstein, San Diego, Calif.

Application December 17, 1951, Serial No. 267,166

19 Claims. (Cl. 219—19)

This invention relates to particles useful in the manufacture of plastic-laminated shock-, impact- and fracture-resisting constructions, building members and the like.

The main object of this invention is to provide rapidly placed and immediately useful materials adapted to be incorporated into and laminated upon concrete bodies.

A further object of the present invention is to achieve the mass production of elements useful in the reinforcing of concrete structures.

A further object of this invention is to provide means for forming compact, light weight layers of high strength laminated for reinforcing concrete. Said means being ready for use in single or multiple layers are adapted to bond to concrete and congeal into unitary structural reinforcement securely and permanently bonded and attached to concrete bodies.

A further object of this invention is to make stranded cable-like reinforcements at place of use, coming to said place of use in packaged assembly of necessary component materials in the most compact form and package containing within itself means for heating at the location of use so as to develop the bond and other desired properties of the resin.

A further object is to provide means and make reinforcing that is packaged in reels or spools or the like of long lengths and assorted widths that can be cut to desired length or shape and also provide means for curing on site, the laminated structures and constructions when placed in use and made from packaged components assembled and prepared for use as disclosed herein.

A further object of this invention is to provide means of heating and polymerizing and curing the plastics by means contained within the package so that any one, even the unskilled can readily make plastic laminated structures of required strength, including, if desired, reinforcing fibers and fillers and other desired components in conjunction with the cured plastics.

As set forth and claimed in my co-pending application, Serial No. 340,642 divided from this application and filed January 16, 1953, the laminations made can be assemblies which make composite members of great strength and durability. Also these bodies can be bonded one to the other to form unitary structures and constructions so designed as to be static structures when loaded with normal loading requirements and also will be able to withstand dynamic shock and impact.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Figure 1 is a view showing a cross section of a cable of my invention.

Figure 2 is a side view of cable of Figure 1.

Figure 3 is an isometric view showing a modified form of this invention.

Figure 4 is a fragmentary sectional view showing a portion of a modified structure similar to that of Figure 3 but on an enlarged scale.

Figure 5 is a sectional view like that of Figure 4, but broken with the left portion showing a cover sheet being stripped off and the right portion showing the bonding of the unit to concrete.

Figure 6 is a sectional view showing a further embodiment of the invention.

This application is a continuation-in-part of my copending application Serial No. 210,803.

Referring to the drawings, the strands used as reinforcing are designated 2 and the same comprises a plurality of strands, each covered with a plastic resin or resins 21.

Any desired number of strands 2, depending on the required cross sectional area of reinforcement required are laid together in non-abrasive relationship and impregnated and coated with plastic resin 21 which contains catalyst 5 necessary for polymerization of the resin when said catalyst is allowed to act by contact and diffusion through the resin and upon proper temperature being attained by the mass through resistance wires 19 when heated by electrical means from source 28. The strands 2 may be unidirectional strands, multi-directional strands, fiber mats, unidirectional fabrics and multi-directional fabrics, in combination, or either of them as required to produce the necessary cross sectional area of reinforcement to carry the required designed loads. The strands are orientated usually in the direction of the greatest tensile strength of the laminated construction, however, compressive strengths, shear strengths and torsion strengths are designed for by orientation and placement by providing opposing resistive forces against applied loads.

In accordance with the invention described and claimed in my copending application, Serial No. 340,642 the factory process prepares correct proportions of reinforcement strands, plastic resins, catalysts, fillers, colors, adhesives; and, according to the present invention, resistance wires, or other electrical means, and are combined into a package which constitutes the product for use as a transportable unit completely ready for placement and use at the site.

The strands may be of sisal, hemp, burlap, cotton, wool, fibers, fiberglass, fused quartz or the like, but not limited to these. Depending on required strengths and quantities each strand type has its best use.

It is preferred, where high strength values are needed, to use fiber glass in its various forms of strands, mats, roving, cords, strings, cables and fabrics, especially in tension as fiber glass is good for 300,000 p. s. i. ultimate in tension.

There are several various resins as herein disclosed that can be said to come under these several types of synthetic resins such as but not limited to the following:

1. Vinyl resins which include resins made from resin derivatives of vinyl
2. Indene resins
3. Lignin plastic materials and substances
4. Sulphonamide resins
5. Phenol aldehyde resins
6. Amino-aldehydic resins
7. Resins from sugar
8. Alkyd resins The synthetic and natural plastics also will provide usable materials and they include as herein mentioned for illustrative purposes but not including all of the plastics usable, the following, but not limited to the following:

1. Buna and Perbunan (polymerized butadiene)
2. Pliofilm (rubber hydrochloride)
3. Neoprene (polymerized chloroprene)
4. Thiokol (polymethylene polysulphide)
5. Tornesit (chlorinated rubber)
6. Pliform (isomerized rubber)
7. Any latex of the above The envelope 3 is preferably of flexible plastic, but also can be rigid any convenient length or kept in long lengths folded at intervals for easy packaging and handling. The envelope 3 can be made out of but not limited to the following, cellophane, cellulose acetate, cellulose acetate butyrate, cellulose nitrate, ethyl cellulose, polyvinyl chloride, vinyl chloride-acetate copolymer, polyvinylidenechloride (Saran), vinyl chloride-vinylidene chloride copolymers, polyvinyl alcohol, polythylene, polytetrafluoroethylene, polystyrene, polyamide (nylon), rubber hydrochloride, rubber vinyl, used alone or in a compatible combination with bonding resins, one of which could be an unsaturated polyester resin and benzoyl peroxide catalyst with added styrene for viscosity control and lead, copper, bronze or rubber as inhibitors.

Such flexible envelope packages with their contained resins may be stored and kept in stock ready for use for reasonable periods of time without deterioration.

The catalyst 5 may be incorporated in the resin or it may be packaged in a separate envelope 4 made of a suitable plastic resin or other tight container, advantageously spaghetti-like in form, and completely sealed. The spaghetti-like flexible envelope 4 containing catalyst 5 if flexible is subject to osmotic action or puncturing or may be subject to crushing, when properly impacted and handled so as to release the catalyst 5 into the resin 21 when it is desired to polymerize and cure the resins 21 to make up a laminated construction from the packaged materials. The catalyst 5 can be of a type that requires substantial heat to complete the reaction between resin 21 and catalyst 5 and this heat is provided by electrical current passed through wire 19. Also, the resins 21 can be such as are settable at room temperature.

The flexible envelopes 3 and 4 can have tensile strengths up to the order of 28,000 p. s. i. together with other desired properties particularly chemical and mechanical properties, as uses require; or several materials may be combined for making envelopes 3 and 4.

Fiber glass 2, for example, may have an ultimate tensile strength of 300,000 lbs. per square inch as compared to new rope of the order of 10,000 to 14,000 p. s. i. (specifications of the U. S. Navy Department issued in October 1929).

Strands 2 may be protected against abrasion and wear by covering them with resin-plastic 21 and even lubricating them against wearing contacts when pliable resins 21 are used, better results will be attained from the fibrous reinforcements 2. Orientation and agglomeration increases strength of the stranded mass in assembly when fixed by plastic resins 21.

Referring to Fig. 1 and Fig. 2 the plastic envelope 3 can be made by extrusion, and fine resistance wire 19 is embedded in the plastic resin 21, being pulled into the body of the resin 21. The package of Figure 1 can be made by covering with the resin 21 these strands 2 and the spaghetti-like catalyst containers 4 and enveloping them in the envelope 3. The whole assembly, being pliable and plastic, is wound in reels of suitable diameter so as not to fracture or damage the strands 2.

The package can also be made by pulling strands 2, such as roving, through suitable sizing means in which the resistance wire 19 also is pulled and the spaghetti-like catalyst 5 container also oriented and placed adjacent to the strands 2 and the whole assembly sprayed or dipped or coated with pliable plastic 3, e. g., a "Pliofilm" type of cover; liquid plastic resins 21 then being introduced by pressure pumping or the like into the envelope 3.

On arrival at the site of use the package reinforcement is unrolled and placed within or upon a concrete construction and anchorage provided as end restraints and prestressing of the strands accomplished if desired.

When put in place, catalyst 5 is released into the plastic resin 21, the electrical resistance wire 19 connected into an energizing circuit and the heated wire 19 allowed to heat the mass to a predetermined temperature and cure said mass in place as a reinforcement making out of the plain concrete a reinforced pre-stressed concrete construction.

Depending upon the flexible envelope materials used, bonded or non-bonded reinforcements can be had. If desired, additional bonding plastics or plastic resins can be applied on the exterior of the reinforcing mass prior to covering with concrete and bond attained by penetrating the adjacent pores by the thermosetting plastic resins of the reinforcement.

Figure 3 shows a plurality of wires 19 and a flat type flexible plastic envelope enclosure 3 containing fiber glass mat 2 which is surrounded and permeated by plastic resin 21. The sealed edges provide protection in handling, and the method of heat sealing the plastic resin envelope 3 also can be used intermittently along the construction to seal off desired lengths.

Fig. 3 also shows electrical circuit 19, 26, 27, 28 used in applying heat for polymerization and curing of the plastic resins.

Figure 4 is an enlarged partial cross sectional view of Fig. 3 and shows flexible envelope 3 containing plastic resins 21, fibrous reinforcements 2, spaghetti-like envelope 4 containing catalyst 5, resistance wire 19 and peel-off type plastic resin envelope covering 22 which will be used when envelope 3 is made as a partially cured plastic resin envelope that is tacky and sticky and adhesive and that will readily bond to porous surfaces and other bondable surfaces.

Fig. 5 further illustrates the cross sectional area of the embodied invention bonded to concrete 1 and particularly illustrates the use of an additional surface layer of adhesive plastic resin 23, which, before application to the concrete is protected by the peel-off cover 22 and as shown, has finger-like penetrations, permeations and also is bonded to the reinforcement. Fiber reinforcement can be used in the resin 23 that projects into the body of the concrete.

The peel-off type plastic resin 22 is shown partially pulled off with the laminate bonded to the concrete 1.

Figure 6 is an enlarged cross section showing fiber glass strands 2 enclosed in plastic resin envelope 3 permeated and impregnated with plastic resin 21, with spaghetti-like plastic envelope 4 containing catalyst 5 placed adjacent to the fiber glass strands 2. The strands 2 are spaced and contained in the plastic resin envelope 3 by heat sealing at 30. Resistance wire 19 is also adjacent to the fiber glass strands 2 and the whole assembly is covered with and protected by a layer of plastic resin 21 enclosed in plastic envelope 3.

Partially completed layers of reinforced plastic resins made in any concrete precast unit sizes or multiples thereof as herein disclosed can be prepared for bonding to the concrete bodies in the factory so that bonding resins or adhesives used are standardized and the pieces die stamped or otherwise precision produced in multiple so that the completed work at the site of use is accurate, uniform and workmanlike.

Of the plastic resin groups that could be used, some of these are as follows: but not limited to these resin groups herein disclosed.

The vinyl derivatives and vinyl resins, the phenol formaldehyde, tar acids and formaldehyde, furfuraldehyde phenol, various aldehydes and cresol and the like; urea and aniline formaldehyde resins, condensed aniline and formaldehyde and other aldehydes. The alkyd resins in all forms compatible with urea, and resins developed from paratoluensulphonamide. Resin from sugar and molasses; polyisobutadiene and related vinyl derivatives; resins made by esterifications or polybasic acids with polyhydric alcohols. Polyisobutylene polymerized with boron trifluoride and also polyisobutadiene, indene resins, natural and synthetic plastics, cellulose, and its derivatives and assorted products, protein plastic such as casein, polypentamethylene sebacamide (nylon), petroleum plastic derivatives, nitrogenous condensation products, resins having germ killing properties or that possess such properties for a limited time period all are desirable for specified uses when so designed.

Polyester resins are easily handled without much equipment and provide one resin type considered practical and which with other resins in combination or alone can and will meet the needs of the constructions herein disclosed.

One important element is the shrinkage factor each resin or combination has since the forces developed by the shrinkage are put to work to prestress the constructions. The relationship to temperatures and changes thereof and particularly ambient temperatures will partly determine selection of resins used for specific constructions.

Fibers selected are subject to stress analysis and each use dictates selection based on cost, availability and strength characteristics. Fiber glass, at present is preferred as the highest strength economical material (300,000 p. s. i. ultimate in tension) with respect to tension loading. It has other definite advantages and characteristics inherent to its nature.

Concrete is a variable material depended upon almost universally. There are many aggregate sources by which the engineer can construct good concrete qualities. With care and present know how 10,000 p. s. i. (in compression) concrete is commercially available.

The combinations of the materials herein disclosed and the resulting constructions will provide for field use, strong reinforcing made of nonmetallic materials capable of being used alone or in combination with metallic known materials.

I claim:

1. A building construction unit adapted to being integrated into a laminated body and prestressed at the site of use; comprising a plurality of strands permeated and covered with plastic resin in its un-polymerized state; means disposed along the outer edge of the plurality of strands to heat said plastic and strands to a predetermined temperature; means disposed along and among the strands and the plastic to catalyze the plastic and polymerize the plastics to a cured state at the site of use; and means to package said materials in "prepared-for-use" state in a unitary package readily transportable for use.

2. A building construction unit as claimed in claim 1; in which the plastic resins are colored.

3. A building construction unit as claimed in claim 1; in which the plastic resins are filled with discrete particles of filler materials.

4. A building construction unit as claimed in claim 1; in which the strands are fiber glass.

5. A building construction unit as claimed in claim 1; in which means for heating comprises one or more resistance wires embedded in the plastic layer of the construction.

6. A construction unit as claimed in claim 1; in which a plastic envelope, strands, plastic resins in their un-polymerized state are assembled with the other claimed parts and components into cable like forms and are pliable and readily coiled up.

7. A construction unit as claimed in claim 1; in which the strands are arranged in longitudinal series into pliable cable like forms coiled upon a reel.

8. A construction unit as claimed in claim 1; in which the strands are arranged in longitudinal series enclosed in a plastic envelope and sealed into compartments of the envelope.

9. A construction unit as claimed in claim 1; in which the means to package said materials comprises one or more plastic envelopes subdivided by heat sealing.

10. A construction unit as claimed in claim 1;

in which the plastic resins have a high shrinkage characteristic which produces substantial internal stresses when the resins are polymerized within the laminated body.

11. A construction unit as claimed in claim 1; in which the means to package said materials is an envelope, decorative and pleasing and useful in an architectural and artistic and esthetic manner.

12. A construction unit as claimed in claim 1; in which the fibers are multi-directional fiber glass of desired strength.

13. A construction unit as claimed in claim 1; in which the means to catalyze the plastic comprises catalyst packaged in spaghetti-like plastic resin enclosure which is rupturable by pressure to release said catalyst into the bonding plastic resin.

14. A construction unit as claimed in claim 13; in which the means to catalyze the plastic comprises a catalyst in a package through the walls of which the catalyst is released by osmotic action.

15. A construction unit as claimed in claim 1; in which the materials used in combination have substantial flexural strength.

16. A construction unit as claimed in claim 1; in which the packaged materials used, when polymerization and cure are completed at the site of use, have substantial tensile strength.

17. A construction unit as claimed in claim 1; in which the packaged materials used, when polymerization and cure are completed at the site of use, have substantial torsional strength.

18. A construction unit as claimed in claim 1; in which the packaged materials used, when polymerization and cure are completed at the site of use, have substantial compression strength.

19. A construction unit as claimed in claim 1; in which the packaged materials used, when polymerization and cure are completed at the site of use, have substantial shear strength.

DAVID RUBENSTEIN.

References Cited in the file of this patent

UNITED STATES PATENTS

| Number | Name | Date |
|---|---|---|
| 830,204 | Boyle | Sept. 4, 1906 |
| 1,142,771 | Hadaway, Jr. | June 8, 1915 |
| 1,376,987 | Wirt | May 3, 1921 |
| 1,742,159 | Hynes | Dec. 31, 1929 |
| 1,960,120 | Mohring | May 22, 1934 |
| 1,972,439 | Dresser | Sept. 4, 1934 |
| 2,241,312 | Luty | May 6, 1941 |
| 2,393,100 | Gallay et al. | Jan. 15, 1946 |
| 2,469,204 | Peters | May 3, 1949 |
| 2,502,147 | Grothouse | Mar. 28, 1950 |
| 2,576,444 | Clinefelter | Nov. 27, 1951 |

FOREIGN PATENTS

| Number | Country | Date |
|---|---|---|
| 592,431 | Great Britain | Sept. 17, 1947 |